United States Patent [19]

Kurokawa

[11] Patent Number: 4,602,325
[45] Date of Patent: Jul. 22, 1986

[54] PROGRAMMABLE CONTROLLER

[75] Inventor: Naohiro Kurokawa, Niigata, Japan

[73] Assignee: Hitachi, Ltd., Tokyo, Japan

[21] Appl. No.: 585,552

[22] Filed: Mar. 2, 1984

[30] Foreign Application Priority Data

Dec. 16, 1983 [JP] Japan .................. 58-236107

[51] Int. Cl.⁴ .................. G06F 15/46; G05B 19/00
[52] U.S. Cl. .................. 364/140; 364/900
[58] Field of Search .................. 364/140–147, 364/900 MS File

[56] References Cited

U.S. PATENT DOCUMENTS 4,064,395 12/1977 Schubeler et al. ............ 364/900 X
4,078,259  3/1978 Soulsby et al. ............... 364/900
4,079,452  3/1978 Larson et al. ................ 364/900 X
4,104,731  8/1978 Grudowski et al. ............ 364/900
4,249,248  2/1981 Yomogida et al. ............. 364/900

Primary Examiner—Joseph Ruggiero
Attorney, Agent, or Firm—Beall Law Offices

[57] ABSTRACT

Each of a plurality of input/output units (2, 3) connected to an arithmetic control unit (1) is provided with a selection latch circuit (23, 33). The selection latch circuits are connected in series in such a manner that the output (25) of the selection circuit of a certain input-/output unit (2) is connected to the input of the selection circuit (33) of the succeeding-stage unit (3). When a selection signal is sent to the input/output unit arranged near to the arithmetic control unit (1), the input-/output unit is addressed by the output of the selection latch circuit, and simultaneously, the signal is transmitted to the selection latch circuits provided in the succeeding-stage input/output circuits.

14 Claims, 6 Drawing Figures

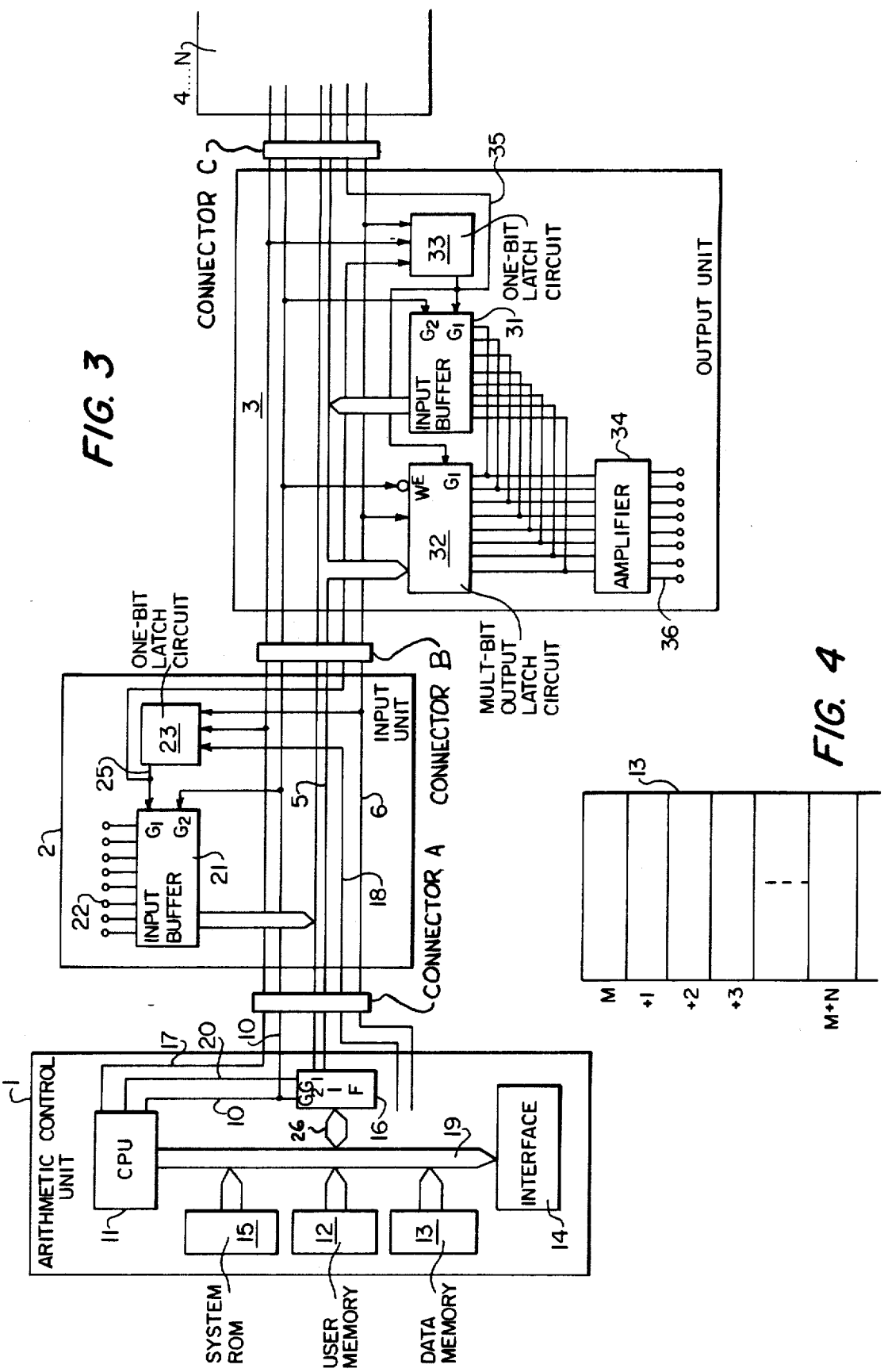

PROGRAMMABLE CONTROLLER

BACKGROUND OF THE INVENTION

The present invention relates to a programmable sequence controller, and more particularly to the facilitated addressing of a programmable sequence controller for a large number of input/output circuits constructed as units.

A conventional "programmable sequence controller system" (hereinbelow termed "PSC") is constructed of a central processing unit which principally executes logic operations, a program memory which stores the contents of programmable logic operations, an input circuit which receives the signals of external contacts in accordance with the arithmetic processing portion of the central processing unit on the basis of the content of the program memory, and an output circuit which delivers an operated result so as to drive external equipment.

With the conventional PSC thus constructed, when the control scale thereof becomes large, the number of input/output circuits separately constructed and arranged increases naturally. In this regard, addresses are selected by one of several methods.

In these methods, input and output circuit portions (the so-called unit type input and output circuits) are disposed separately from the arithmetic control unit which includes a central processing unit and the program memory. In one of these methods, addresses defined by switches for the respective input and output units are appointed by signals from the arithmetic control unit. In another method, addressing signal lines are successively shifted at points inside the respective input and output units whereby addresses are automatically appointed in hardware fashion.

The above methods, however, have the disadvantage of requiring a large number of address signal lines which interconnect the input/output circuit units and the arithmetic control unit. Another problem is that the system is liable to receive much external noise through the signal lines. Moreover, in arranging the input and output units, these units need to be distinguished. This leads to such disadvantages that a special circuit therefor must be used and that signals to be transmitted must be individually identifiable in advance.

SUMMARY OF THE INVENTION

An object of the present invention is to overcome the problems mentioned above and to provide a programmable sequence controller which can arrange input/output units (external units) at will with a small number of signal lines and with simple circuitry.

Another object is to provide a programmable controller which need not distinguish between the signals to be transmitted for selecting addresses.

It is a further object of this invention to provide a programmable controller to which input and output units can be easily added.

According to the present invention, respective input/output units connected to an arithmetic control unit are provided with selection latch circuits, which are connected in series in such a manner that the output of the selection latch circuit of a certain input/output unit is connected to the input of the selection latch circuit of the succeeding-stage unit. When a selection signal is sent to the input/output unit arranged near the arithmetic control unit, an address is selected by the output of the corresponding selection latch circuit, and the signal is transmitted to the selection latch circuits disposed in the input/output units at the succeeding stages.

BRIEF DESCRIPTION OF THE DRAWINGS

Refer now, to the accompanying drawings in which like reference symbols indicate the same or similar components, wherein:

FIG. 3 is a block diagram showing a first embodiment of the present invention.

FIG. 4 is a diagram for explaining a data memory in the embodiment of FIG. 3.

DETAILED DESCRIPTION OF THE INVENTION

Figure 1:
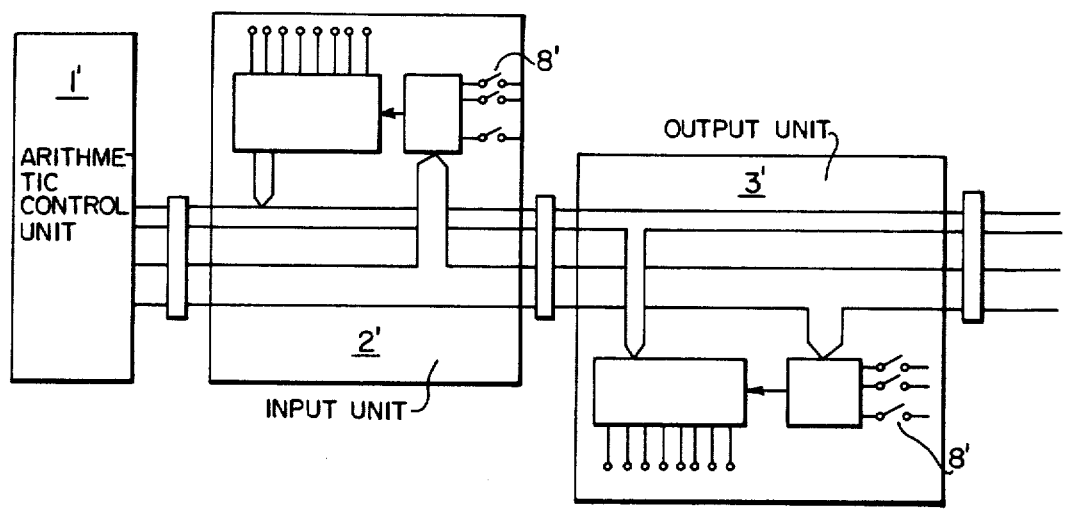
FIG. 1 is a circuit block diagram showing a prior art embodiment wherein setting switches are disposed for address allocation.
Figure 2:
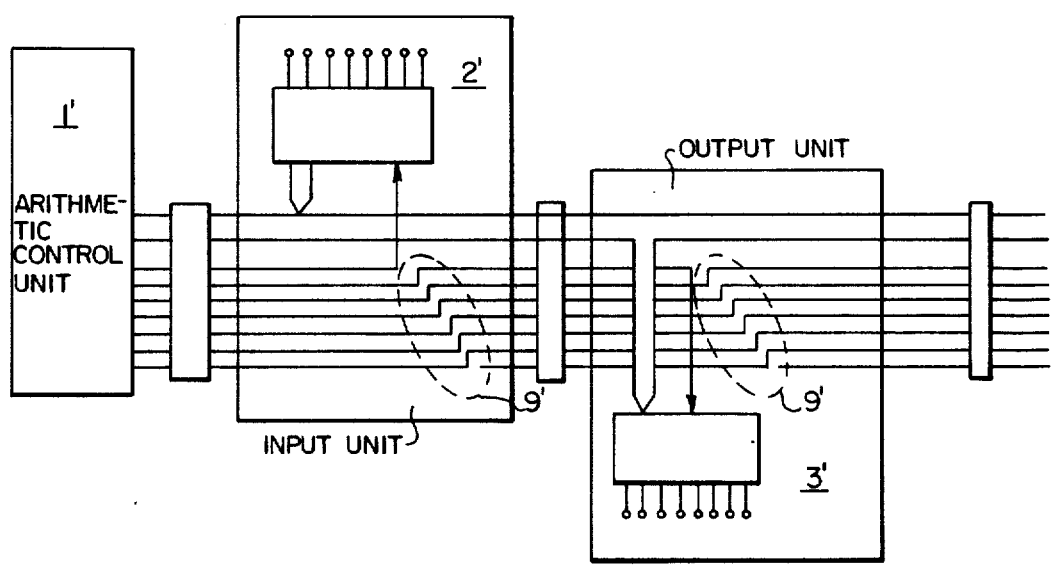
FIG. 2 is a circuit block diagram showing a prior art embodiment wherein address selecting signal lines are shifted and latched.

Refer now to FIGS. 1 and 2 where prior art circuits for conventional programmable sequence controllers are constructed. In this regard, addresses are appointed by methods illustrated in FIGS. 1 and 2. Input and output circuit units 2' and 3' (the so-called unit type input and output circuits) are disposed separately from the arithmetic control unit which includes a central processing unit and the program memory. In the method of FIG. 1, addresses defind by switches 8' for the respective input and output units are appointed by signals from the arithmetic control unit 1'. In the method of FIG. 2, addressing signal lines are successively shifted at points 9' inside the respective input and output units whereby addresses are automatically appointed in hardware fashion.

The above methods, however, have the disadvantage of requiring a large number of addressing signal lines which connect the input/output units and the arithmetic control units. Another problem is that the system is liable to receive significant external noise through the signal lines. Moreover, in arranging the input and output units, these units need to be distinguished. This leads to the disadvantage that a special circuit therefor must be disposed and that signals to be transmitted for appointing addresses must be individually identifiable in advance.

Now, a first embodiment of the present invention will be described in detail with reference to FIGS. 3 and 4.

In FIG. 3, numeral 1 designates an arithmetic control unit for executing logic operations and various controls as a PSC. It includes a central processing unit (hereinbelow, termed "CPU") 11 which executes various operations, a storage portion (hereinbelow, termed "user memory") 12 which stores the contents of programmable logic operations, a random-access data memory (RAM) 13 which stores information (ON or OFF status) from an external input or output unit (hereinbelow, termed "input unit or output unit") or an internal input or output processing result, a loader interface circuit 14 which accesses a program loader (not shown in the figure) for indicating a program operation or program content, and a read only memory system (ROM) 15 which stores the procedure for generally controlling the various portions mentioned above.

Numeral 16 designates an interface circuit (IF) for the input and output units. One side of the interface circuit 16 is connected with a CPU bus 19 by a bidirectional bus buffer 26, while the other side is connected with the unit bus 5 of the input unit 2 and output unit 3 through a connector A. The interface 16 has control terminals $G_1$ and $G_2$, the former $G_1$ of which is connected to a system selection signal line 20 and the latter $G_2$ of which is connected to the terminal of the CPU 11 for sending a signal (R/W signal) controlling a bus direction. The interface 16 assumes the three states of producing logic output signals ZERO and ONE, and besides, becomes a high resistance when rendered non-selected by a selection signal. In addition, it is controlled by the R/W signal (read/write signal) which is sent from the CPU 11 through an R/W line (read/write line) 10.

Numeral 18 designates a selection line (address bus), and numeral 17 a clock line (address bus) which transmits a selection timing signal and which is connected through connectors A, B and C to circuits included in the succeeding-stage units.

The input unit 2 comprises an input buffer (external input buffer) 21, and a one-bit latch circuit 23 serving as a selection latch circuit. The input buffer 21 is supplied with an external signal through terminal 22 from an external contact or the like free from chattering, and it delivers its output in the form of the three states. That is, the input buffer 21 is controlled by the latch output signal of the latch circuit 23, and it becomes a high resistance or delivers the external signal in unchanged status. The output of the input buffer 21 is connected in parallel to the unit bus 5. The latch circuit 23 is connected in parallel to the clock line 17 and selection line 18 through the connector A. In addition, the output line 25 (address bus) of the latch circuit 23 and the unit bus 5 are connected to the succeeding-stage units through the connectors B, C. Shown at numeral 6 is a reset line for sending a reset signal from the arithmetic control unit 1 to the various units.

The output unit 3 includes a multi-bit output latch circuit 32 whose input terminals are connected to the unit bus 5. It receives and latches data on the unit bus 5 at a predetermined sequentially occurring time in accordance with a signal from the output line 35 (address bus) of a one-bit latch circuit 33 to be described later, and it applies the latched contents to an output signal amplifier circuit 34, which feeds output lines 36 with a signal for driving external equipment. Numeral 31 denotes an input buffer (inner input buffer) which feeds the aforementioned latched content back to the unit bus 5 at a predetermined time in accordance with the signal through the output line 35. It has the same structure as that of the input buffer 21.

Likewise, to the foregoing latch circuit 23, the one-bit latch circuit 33 has its output terminal 35 connected to the succeeding stage through the connector C. Latch circuits 23, 33 are connected in series by address buses 18, 25 and 35. These latch circuits and lines do not compose a closed circuit as taught by prior art. The end of the address bus is available for connection to an additional unit.

Symbols 4, . . . and N denote input units or output units, which are respectively the same in construction as the corresponding one of either unit 2 or unit 3.

The latch circuits 23, 33 of the respective input and output units 2, 3 have the clock line 17 connected in common, and are supplied with the clock signal from the arithmetic control unit 1. Accordingly, a selection signal from the selection line 18 to be applied to the input terminals of the respective latch circuits is synchronously latched. The R/W signal delivered to the R/W line 10 is defined as the read status when its level is a logical ONE, and as the write status when a logical ZERO. It is applied to the selection terminal $G_2$ of the input buffer 21 or 31, and also to the write enable signal terminal WE of the latch circuit 32. More specifically, when the output signal at the output line 25 or 35 of the latch circuit 23 or 33 and the R/W signal have fulfilled a predetermined condition (both being in one logical condition), the input buffer 21 or 31 can deliver the input signal to the unit bus 5, and similarly, the output latch circuit 32 can latch the signal of the unit bus 5.

The one-bit latch circuits of the respective units have the reset line 6 connected in common, and they reset the latched contents at the closure of a power supply in accordance with the reset signal.

The operation of the PCS thus constructed will be described with reference to FIGS. 3 and 4.

After the closure of the power supply, the arithmetic control unit 1 transmits an external input signal to the predetermined position of the random-access data memory 13 prior to performing processing functions such as the logic operation. More particularly, it operates as follows:

(1) The CPU 11 sends a signal ONE as an address signal through the selection line 18 to the unit 2 which is connected nearest to the arithmetic control unit 1, to latch this signal in the latch circuit 23. The latch timing is determined by the clock signal which is transmitted through the clock signal line 17. At the same time, the latch circuit 33 at the succeeding stage performs a latch operation. Since, however, the signal of the output line 25 of the latch circuit 23 to be applied as the input of the latch circuit 33 is still ZERO, merely this ZERO is latched. During the first timing interval, accordingly, only the input unit 2 is appointed.

(2) The status of the output line 25 of the latch circuit 23 changes from ZERO into ONE, which indicates the appointment of the unit 2 and the new status is transmitted to the terminal $G_1$ of the input buffer 21.

(3) The CPU 11 first reads out the content of the head address of the data memory 13 shown in FIG. 4, and writes this content into the interface 16. Specifically, the interface 16 is selected, the R/W line 10 is rendered ZERO, the direction of the unit bus 5 is brought into conformity with the direction of the input/output unit, and the information of the CPU bus 19 is transmitted on the unit bus 5 to the input/output unit.

At this time, among the input and output units, the unit 2 is in the selected status. Since, however, the terminal $G_2$ of the input buffer 21 receives the ZERO signal (supplied by the R/W line 10), the output thereof is still at a high resistance, and the data on the unit bus 5 is neglected.

(4) Subsequently, the CPU 11 operates to read out the interface 16. Specifically, the interface 16 is selected, the R/W line 10 is rendered ONE, and the bus direction is changed to the direction of the CPU bus 19. Thus, both the terminals $G_1$ and $G_2$ of the input buffer 21 of the input unit 2 become ONE, so that the external input signals through terminals 22 are delivered to the unit bus 5 and are also transmitted to the CPU bus 19. In this way, the CPU 11 performs the operation of reading out the external input signal.

(5) The CPU 11 transmits the information (the input signal) to the head position M of the data memory 13 in FIG. 4.

(6) Next, ZERO as an address signal is latched in the input/output unit connected nearest to the arithmetic control unit 1 (the input unit 2 in the case of FIG. 3), through the selection line 18 by the CPU 11. The timing of the latch is the same as in Item (1). Now, let's consider the latch contents of the latch circuits 23 and 33 of the input unit 2 and the output unit 3. Since the content sent through the selection line 18, namely, ZERO is latched in the input unit 2, the output line 25 of the latch circuit 23 becomes ZERO. Therefore, one terminal $G_1$ of the input buffer 21 falls into the non-selected status, and the output thereof falls into the high resistance status. Here, the latch circuit 33 of the output unit 3 latches the signal of the preceding stage, namely, the previous output content ONE of the latch circuit 23 of the input unit 2. Consequently, the output line 35 of the latch circuit 33 becomes ONE to bring one selection terminal $G_1$ of the input buffer 31 into the selected status and also the latch circuit 32 into the selected status.

(7) The CPU 11 writes the content of the next position M+1 to the head position of the data memory 13 shown in FIG. 4, into the interface 16. That is, the R/W line 10 is rendered ZERO to bring the bus direction to the direction of the input/output unit and to transmit the information of the CPU bus 19 to the unit bus 5.

Since, at this time, the write enable terminal WE of the output latch circuit 32 becomes ZERO, the content on the unit bus 5 is latched. This content is delivered to the amplifier circuit 34. Here, the input buffer 31 is still in the high resistance status because one terminal $G_2$ thereof is ZERO.

(8) Next, the CPU 11 operates to read out interface 16. That is, the R/W line 10 is rendered ONE. One terminal $G_2$ of the input buffer 31 accordingly becomes ONE, so that the foregoing content of the latch circuit 32 is transmitted through the input buffer 31 to the unit bus 5 and then to the CPU bus 19. Thus, the CPU 11 reads this information as an internal input signal and transmits it to the next position M+1 to the head position of the data memory 13 in FIG. 4. That is, the content of the position M+1 of the memory 13 remains unchanged.

(9) Thenceforth, similar operations are successively repeated from the next position M+2 of the data memory 13 to the position M+N thereof. Then, the operations previous to the logic operation end.

(10) Thereafter, the CPU 11 starts a logic operation in accordance with the contents of the user memory 12. At this time, the reception of inputs and the delivery of an operated result are performed with respect to the data memory portion 13.

(11) When all the operations according to the contents of the user memory portion 12 (one scanning) have ended, the same operations are repeated from Item (1) again.

In the way thus far described, the logic opeations are executed after the writing and reading operations between the input/output units and the data memory portion 13 have been performed in advance. As understood from the above, since the signals for selecting the respective units are transmitted in series through the one-bit latch circuits, the units are reliably selected in succession. In a case where the contents of the data memory 13 has been transmitted to the input unit, it is neglected, and in a case where the output unit has been read out, the same contents are fed back to the data memory 13. Accordingly, the same appointment signal can be supplied irrespective of the difference in the input and output units. Furthermore, latch circuits 23, 33 and address buses 18, 25, 35 do not make a closed circuit. Therefore, the input/output units can be freely and easily arranged.

The above description concerns the embodiment of fast operation in which each unit can simultaneously handle a plurality of input or output signals therein. To this end, the unit bus 5 is composed of a plurality of lines.

Figure 5:
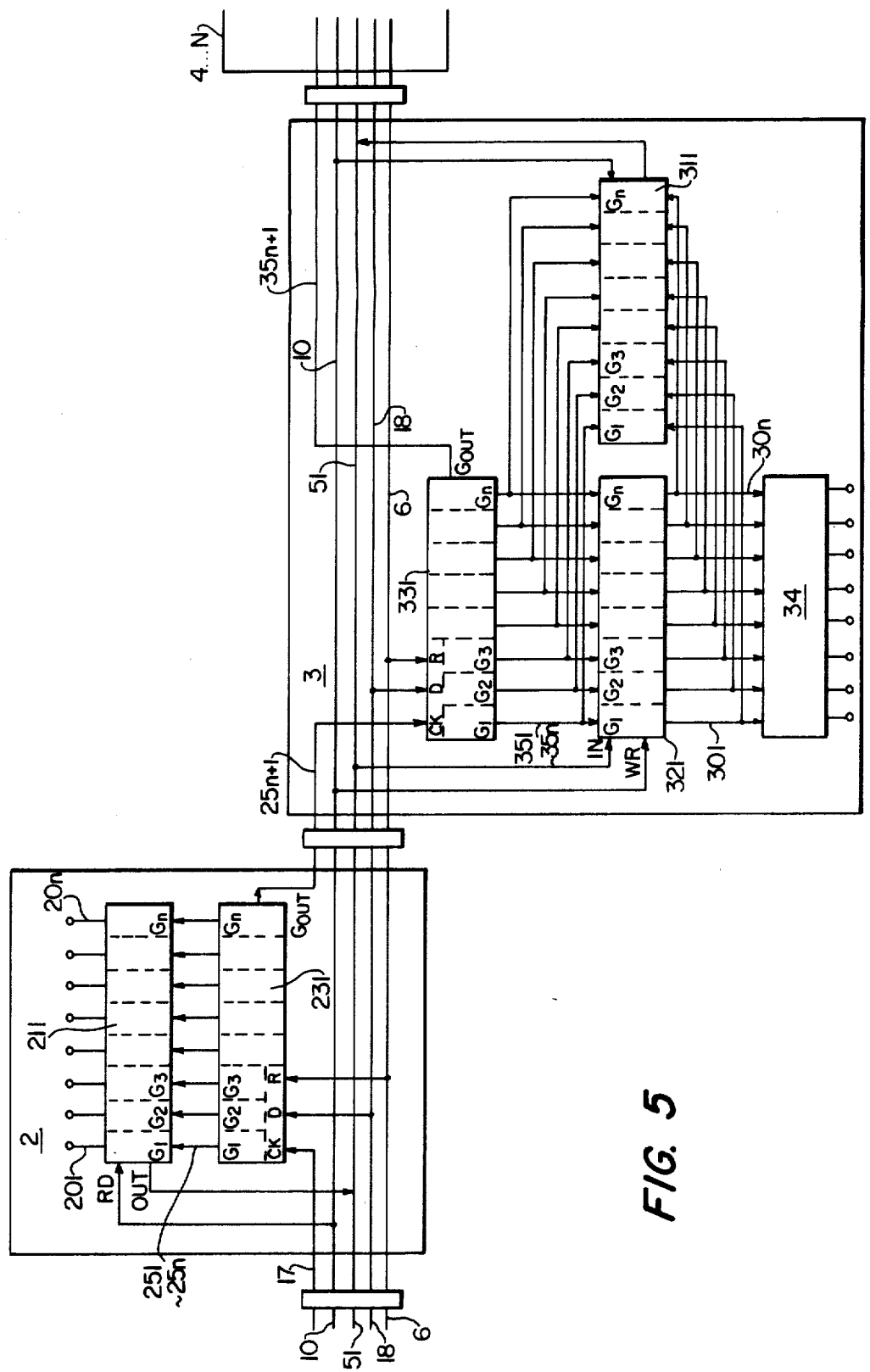
FIG. 5 is a block diagram of a second embodiment of the present invention.

Now, a second embodiment will be described. FIG. 5 shows the circuit arrangement thereof.

Numeral 2 designates an input unit. Numeral 211 designates a multi-bit input buffer, which is an element provided with parallel signal input terminals 201-20n, selection terminals $G_1$-$G_n$ corresponding to the input terminals, and a signal output terminal (data terminal) as well as read terminal (data terminal) RD.

Here, the functions of the element are as explained below. When the read terminal RD is ZERO, the signal output terminal OUT assumes a high resistance status. Also when the read terminal RD is ONE and none of the selection terminals $G_1$-$G_n$ is selected, the signal output terminal OUT assumes the high resistance status. Further, when the read terminal RD is ONE and any of the selection terminals $G_1$-$G_n$ has been selected, the signals of the parallel signal input terminals 201-20n corresponding to the selection terminals $G_1$-$G_n$ are transmitted to the signal output terminal OUT.

Next, numeral 231 indicates a kind of shift register of serial bits, which is formed of a multi-bit latch element constructed of a plurality of latches. The shift register 231 has parallel output terminals $G_1$-$G_n$, a serial input terminal D, a serial output terminal (an end output terminal) $G_{OUT}$ which generates a clock signal at an overflow, a clock terminal CK, and a reset terminal R. This latch element 231 is such that a plurality of one-bit latch circuits as explained in the preceding embodiment are connected in series. In function, it executes the same operation as in the preceding embodiment. That is, in accordance with the clock signals supplied by the clock line 17, the signals of the input terminal D are successively shifted and transmitted to the output terminals $G_1$-$G_n$ of the respective bits. In addition, after the shifted signals have reached the terminal $G_n$, the clock signal is transmitted to the clock terminal CK of a succeeding-stage unit through a transmission line $25_{n+1}$ as the signal of the output terminal $G_{OUT}$. In this embodiment, clock line 17, transmission lines $25_{n+1}$, $35_{n+1}$ will be address buses.

Now, the output unit 3 will be explained. Numeral 331 indicates a latch circuit which is formed of a multi-bit latch element, and which has the same construction as that of the aforementioned multi-bit latch element 231. Numeral 231 indicates an output latch circuit, which has a plurality of parallel output terminals 301-30n, selection terminals $G_1$-$G_n$ corresponding to the output terminals, a data input terminal IN and a write terminal WR. The element 321 functions as stated below. When the write terminal WR is ONE, or when none of the selection terminals $G_1$-$G_n$ is selected, the parallel output terminals 301-30n hold previous states. When the write terminal WR is ZERO and any of the selection terminals $G_1$-$G_n$ is selected, the contents of the data input terminals IN are stored in the latches of the element 321 corresponding to the selection terminals $G_1$-$G_n$ and are also transmitted to the parallel output terminals 301-30n.

An input buffer 311 has the same construction as that of the multi-bit input buffer 211 explained on the input unit 2, and can transmit the output signals of the output latch element 321 to a data line 51.

Now, the operations of the input/output unit thus constructed will be described.

(1) The multi-bit latch circuits 231 and 331 are reset by the reset line 6 in advance, and all the selection terminals (Gi-Gn) thereof are in the non-selected states.

(2) ONE is latched in the multi-bit latch circuit 231 of the unit connected nearest to the CPU 11 ( the input unit 2 in the case of FIG. 5), through the selection line 18 by the CPU 11. The timing of the latch is determined by the clock signal transmitted to the clock line 17.

(3) The CPU 11 reads out the content of the head position M of the data memory 13, and transmits it to the data line 51.

(4) The CPU 11 renders the R/W line 10 ZERO.

(5) At this time, the multi-bit latch circuit 231 is in the state in which its head bit is selected in Item (2). Since, however, the read terminal RD is ZERO, the output terminal OUT is in the high resistance state, and the content transmitted to the data line 51 is ignored.

(6) Next, the CPU 11 renders the R/W line 10 ONE. Since, at this time, the selection terminal $G_1$ is the selected status (refer to Item 5), the external input signal of the parallel signal input terminal 201 corresponding to this selection terminal is transmitted to the data line 51 through the terminal OUT.

(7) The CPU 11 reads this content, and transmits it to the part of the head position M of the data memory 13 corresponding to the bit $G_1$ so as to store it therein.

(8) Subsequently, a ZERO (non-selecting address signal) is latched in the multi-bit latch element 231 of the unit connected nearest to the CPU 11 (the input unit 2 in the case of FIG. 5), through the selection line 18 by the CPU 11. The timing of the latch is determined by the clock signal of the clock line 17.

At this time, the multi-bit latch circuit 231 is subjected to a shift operation, and the second selection terminal $G_2$ becomes ONE, so that the $G_2$ part of the input buffer 211 falls in to the selected status.

(9) Thenceforth, the steps 1 through 8 are repeatedly peformed to store the external input signals in the position M of the data memory 13. Further, necessary input signals are received in positions (M+1)−(M+N). Thereafter, the CPU 11 executes a logic operation in accordance with the contents of the user memory 12. When this operation has ended, the operations are repeated from the step (1) again.

While the description of the operation of the output unit has been omitted here, the content fed to the data line 51 in the step (5) is transmitted to the parallel output terminal 351-35n of the latch circuit 331 corresponding to the selected selection terminal.

Whereas the plurality of unit buses 5 being composed of many data lines are disposed in the first embodiment described before, the single data line 51 suffices in the second embodiment. Accordingly, a still smaller number of signal lines may be laid.

Both the first embodiment and the second embodiment are of the system wherein zero is repeatedly latched in the one-bit latch circuit or the multi-bit latch circuit. As regards this operation, once it has been latched on the side of the CPU 11, the repetition is avoided to quicken the operation of the sequence controller to that extent.

Now, a third embodiment will be described with reference to FIG. 6.

Figure 6:
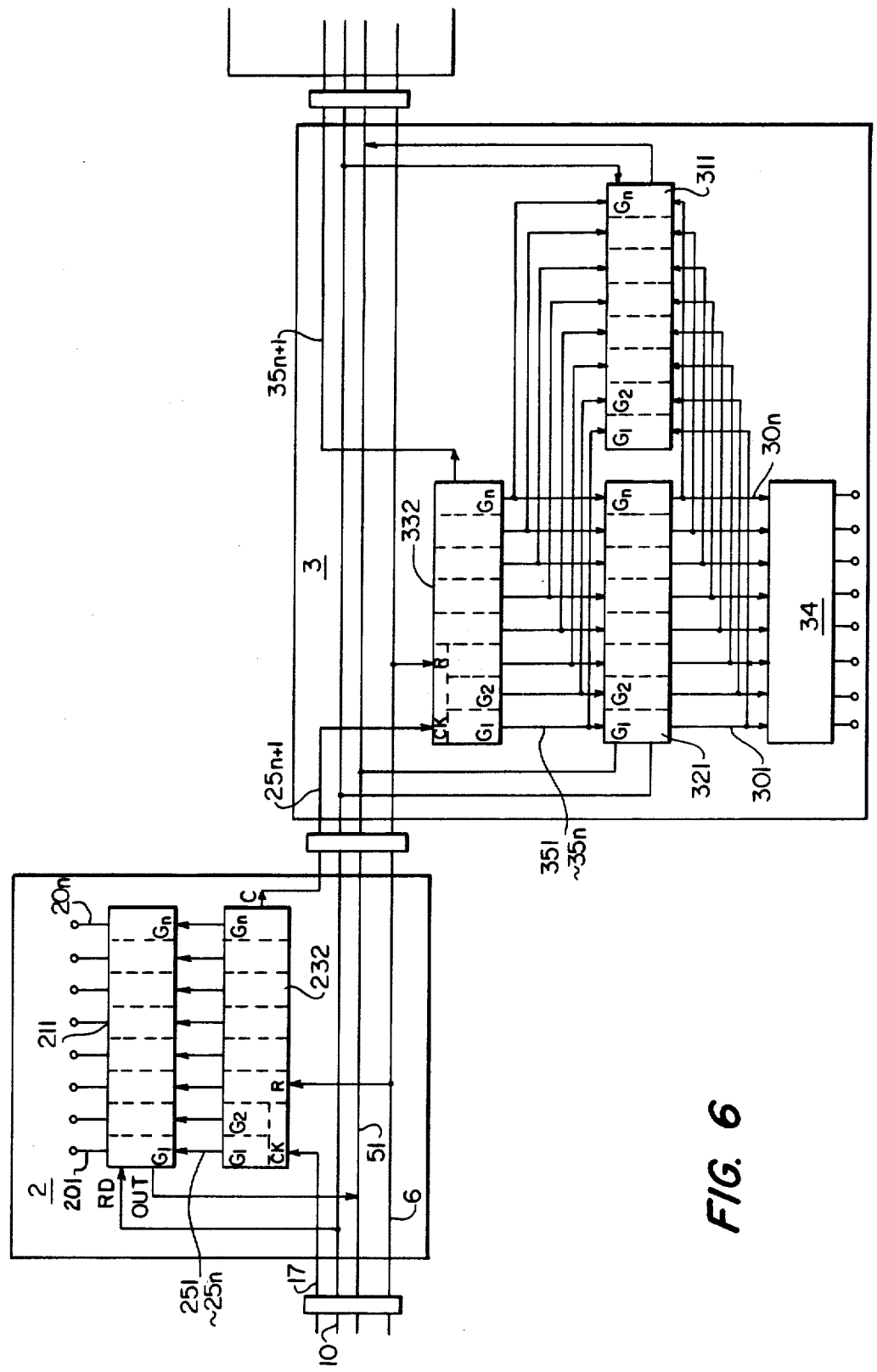
FIG. 6 is a block diagram of a third embodiment of the present invention.

In the embodiment of FIG. 6, the latch circuit in the first or second embodiment is replaced with an n-bit counter 232 (332), and the other portions are the same in the second embodiment. In the ensuing description, accordingly, the n-bit counter 232 (332) will be detailed.

The n-bit counter 232 (332) has a clock terminal CK, parallel output terminals $G_1$-$G_n$, a carry output terminal C, and a reset terminal R. In function, outputs are successively provided at the output terminals $G_1$-$G_n$ in correspondence with the numbers 1-n of clock pulses impressed on the clock terminal CK. Each time a clock pulse is received in excess of the number n, one overflow signal is provided at the carry output terminal C and is transmitted to the succeeding stage as a clock signal.

That is, the output terminals $G_1$-$G_n$ correspond to the selection terminals of the foregoing embodiments.

In the present embodiment, the clock pulses are counted automatically from zero in accordance with the number thereof by the counter of n bits. Therefore, the respective external input signals 201-20n corresponding to the number of clock pulses can be read or the signal of the data line 51 can be transmitted to the output latch circuit 321, without the necessity of transmitting the information one or zero for selection from the CPU 11 to the unit nearest thereto as in the first or second embodiment. Accordingly, the signal line 18 in the preceding embodiment is dispensed with, and the respective units can be selected with a smaller number of signal lines.

In a case where the n-bit counter 232 (332) is included in the multi-bit input buffer 211 or multi-bit latch circuit 231, wiring leads etcetera become unnecessary, and the sequence controller becomes more immune against external noise.

The present invention thus far described brings forth effects to be described below.

According to the present invention, an input or output unit is provided with an addressing latch circuit. Thus, even when a large number of input/output units are connected, a small number of addressing lines suffice for appointing the respective units.

Moreover, the input/output units can be arranged at will irrespective of the sequence thereof, and the ratio of distribution of the input units and the output units can be freely and easily changed.

In an aspect of performance, the number of input/output units is set at 64. With the prior art of FIG. 1 wherein each input or output unit is provided with the selection circuit, at least seven signal lines are required for address allocation. In contrast, with the present invention, two signal lines suffice, and the number of the signal lines decreases to 1/3.5. Besides, with the prior art of FIG. 2 wherein the addressing signal lines are shifted and laid through the connectors between the adjacent units, 64 signal lines are necessary. Therefore, as compared with this prior art, the present invention can reduce the number of signal lines to one thirty-second of that required by the prior art.

I claim:

1. A programmable controller, comprising:
   an arithmetic control unit for executing logic operations with input signals to provide output signals, and for generating address signals;

a unit bus for transmitting said input and output signals;

an address bus for transmitting said address signals, wherein said address bus comprises one of a selection line transmitting a selection signal and a clock line transmitting a clock signal;

a plurality of external units connected to said arithmetic control unit by said unit bus and said address bus for executing at least one of the operations of receiving input signals to be transmitted through said unit bus to said arithmetic control unit and sending of said output signals of said arithmetic control unit through said unit bus to drive an external load on the basis of commands of said arithmetic control unit, each of said external units including a selection latch circuit rendering one of the corresponding units conductive with said unit bus when latching said address signal sent from said arithmetic control unit through said address bus, said selection line being connected to input terminals of said selection latch circuits, said clock line being connected to a clock terminal of said selection latch circuits, said selection latch circuits being connected in series by one of said selection line and said clock line to the corresponding latch circuit of adjoining of said external units whereby said address signal supplied to said external units may be transmitted to said selection latch circuits of succeeding-stage units, said selection latch circuits being connected to the respective external units by said address bus whereby said address signal supplied to said external units may be transmitted to said selection latch circuits of succeeding-stage units.

2. A programmable controller, comprising:

an arithmetic control unit for executing logic operations with input signals to provide output signals, and for generating address signals;

a unit bus for transmitting said input and output signals;

an address bus for transmitting said address signals, wherein said address bus transmits a clock signal; and a plurality of external units connected to said arithmetic control unit by said unit bus and said address bus for executing at least one of the operations of receiving input signals to be transmitted through said unit bus to said arithmetic control unit and sending of said output signals of said arithmetic control unit through said unit bus to drive an external load on the basis of commands of said arithmetic control unit, each of said external units including a selection latch circuit having a clock terminal connected to said address bus to receive said clock signal, said selection latch circuits being connected in series by said address bus to the corresponding latch circuit of succeeding of said units whereby said clock signal supplied to said external units may be transmitted to said selection latch circuits of succeeding-stage units, said selection latch circuits rendering one of the corresponding external units conductive with said unit bus when latching said address signal sent from said arithmetic control unit through said address bus, said selection latch circuits being connected to the respective external units by said address bus whereby said address signal supplied to said external units may be transmitted to said selection latch circuits of succeeding-stage units.

3. A programmable controller according to claim 1, wherein said selection latch circuits are connected in series by said selection line to corresponding ones of said units and each generate an output signal from an output terminal to render the selected unit responsive to said unit bus while said selection latch circuit is latching said selection signal, said output terminals of said selection latch circuits being connected to the input terminals of the selection latch circuits of next succeeding-stage units to transmit said output signal to said succeeding-stage units as an address signal.

4. A programmable controller according to claim 1, wherein said selection latch circuits are multi-bit shift registers for shifting said address signal by clock signal and connected in series by said clock line to the respective units, said shift registers having parallel output terminals of said each bit and an end output terminal of the last bit of said bits, said shift registers generating a plurality of output signals to render the corresponding unit responsive to said unit bus while shifting, and generating a clock signal to be sent to said clock terminal of a selection latch circuit of a succeeding-stage unit as an address signal from said end output terminal.

5. A programmable controller according to claim 2, wherein said selection latch circuits are multi-bit counters for counting the clock signals and are connected in series by said clock line to the respective units, said counter having parallel output terminals and a carry output terminal for the last bit, said counters generating a plurality of latch output signals to render the corresponding unit responsive to said unit bus while counting, and generating a clock signal to be sent to a selection latch circuit of a succeeding-stage unit as an address signal from said serial output terminal.

6. A programmable controller according to claim 3, wherein said external unit has an input buffer connected to said unit but for transmitting one of said external input signals and inner input signals to said arithmetic control unit in response to reception of said output signal of said selection latch circuit.

7. A programmable controller according to claim 4 wherein said external unit has an input buffer connected to said unit bus for transmitting one of said external input signals and inner input signals to said arithmetic control unit in response to reception of said parallel output signals from said parallel output terminals.

8. A programmable controller according to claim 5, wherein said external units have an input buffer connected to said unit bus for transmitting one of said external input signals and inner input signals to said arithmetic control unit in response to reception of said latch output signals from said parallel output terminals.

9. A programmable controller comprising:

an arithmetic control unit for executing logic operations with input signals to provide output signals, and for generating address signals;

a unit bus for transmitting said input and output signals;

an address bus for transmitting said address signals;

an input unit connected to said arithmetic control unit by said unit bus and address bus for receiving said input signals to be transmitted through said unit bus to said arithmetic control unit, on the basis of commands of said arithmetic control unit and having a selection latch circuit appointing the corresponding input units responsive to said unit bus when latching said address signals; and an output unit connected to said arithmetic control unit by said unit bus and address bus for sending said output signals of said arithmetic control unit through said unit bus on the basis of commands of said arithmetic control unit, and having a selection latch circuit appointing the corresponding output unit responsive to said unit bus when latching said address signal;

said selection latch circuits being connected to the respective units by said address bus whereby said address signal supplied to said external units may be transmitted to said selection latch circuits of succeeding-stage units.

10. A programmable controller, according to claim 9 wherein said arithmetic control unit contains at least one unit of said input unit and output unit, said selection latch circuits being connected in series to the respective input unit and output unit by said address bus, whereby said address signal supplied to said unit included in said arithmetic control unit may be transmitted to said selection latch circuits of succeeding-stage units.

11. A programmable controller according to claim 9, wherein said input unit comprises a selection latch circuit and an input buffer, and said output unit comprises a selection latch circuit, an input buffer, and said output unit includes a selection latch circuit, an input buffer and an output latch circuit, said input buffers being connected to said unit bus for transmitting one of an external input signal from an external device and an inner input signal of said arithmetic control unit to said arithmetic control unit, said output latch circuit being connected to said unit bus for transmitting output signals of said arithmetic control unit to said external load in response to reception of an address signal of selection latch circuits of said input and output units.

12. A programmable controller according to claim 11, wherein said selection latch circuit is a multi-bit latch circuit which has a plurality of bits connected in series to each other with parallel output terminals for each bit and an output terminal for the last bit, said multi-bit latch circuit generating a plurality of latch output signals to render the corresponding input or output unit responsive to said unit bus while said multi-bit latch circuit is shifting said address signal, and generating a clock signal to be sent to a selection latch circuit of a succeeding-stage unit as an address signal from said output terminal for the last bit.

13. A programmable controller according to claim 11, wherein said selection latch circuit is a multi-bit latch circuit having parallel output terminals for each bit, and said input buffer is a multi-bit buffer having a plurality of selection terminals for each bit, and a data terminal connected to said unit bus, said selection terminals being connected to the corresponding output terminals of said multi-bit latch circuit, and said output latch circuit is a multi-bit output latch circuit having parallel output terminals for each bit and a data terminal connected to said unit bus, said multi-bit circuit generating a plurality of latch output signals in order of timesharing whereby each bit of said multi-bit input buffer and output latch circuit is selected in order of timesharing to transmit a data signal in series between said unit bus and the selected bit.

14. A programmable controller comprising:
an arithmetic control unit for executing logic operations with input signals to provide output signals, and for generating address signals;
a unit bus for transmitting said input and output signals;
an address bus for transmitting said address signals;
an input unit connected to said arithmetic control unit by said unit bus and address bus for receiving said input signals to be transmitted through said unit bus to said arithmetic control unit on the basis of commands of said arithmetic control unit having a multi-bit input buffer for transmitting said input signals to said arithmetic control unit through said unit bus, and having a multi-bit selection latch circuit for rendering the corresponding input buffer responsive to said unit bus while shifting said address signals; and
an output unit connected to said arithmetic control unit by said unit bus and address bus for sending said output signals of said arithmetic control unit through said unit bus on command of said arithmetic control unit, and having a multi-bit output latch circuit for receiving and sending said output signals to an external load, and having a multi-bit selection latch circuit conductively connecting the corresponding output latch circuit of a corresponding output unit to said unit bus and said external load;
said each selection latch circuit of each input and output units being connected in series in a clock line by said address bus to the corresponding latch circuit of succeeding ones of said units, whereby each bit of said selection latch circuits is connected in series to transmit said clock signal to succeeding-stage bits and designate each bit of said input buffer and output latch circuit to be selected in order of timesharing.

* * * * *